United States Patent
Takagi et al.

(10) Patent No.: US 7,134,688 B2
(45) Date of Patent: Nov. 14, 2006

(54) SAFETY APPARATUS AGAINST AUTOMOBILE CRASH

(75) Inventors: Akira Takagi, Nagoya (JP); Ari Widodo, Tokyo (JP)

(73) Assignee: Denso Corporation, Kariya (JP)

( * ) Notice: Subject to any disclaimer, the term of this patent is extended or adjusted under 35 U.S.C. 154(b) by 365 days.

(21) Appl. No.: 10/618,614

(22) Filed: Jul. 15, 2003

(65) Prior Publication Data

US 2004/0021305 A1    Feb. 5, 2004

(30) Foreign Application Priority Data

Jul. 17, 2002    (JP) .............................. 2002-208781

(51) Int. Cl.
*B60R 21/16* (2006.01)
(52) U.S. Cl. ................... 280/735; 356/4.03; 356/614; 382/104; 701/45
(58) Field of Classification Search ................ 280/735; 382/103, 104, 118; 356/4.03, 4.04, 4.05, 356/614; 701/45
See application file for complete search history.

(56) References Cited

U.S. PATENT DOCUMENTS

| | | | | |
|---|---|---|---|---|
| 6,116,639 A * | 9/2000 | Breed et al. ................. | 280/735 |
| 6,292,574 B1 * | 9/2001 | Schildkraut et al. ........ | 382/117 |
| 6,292,727 B1 * | 9/2001 | Norton ......................... | 701/45 |
| 6,345,110 B1 * | 2/2002 | Niyogi et al. ............... | 382/118 |
| 6,662,093 B1 * | 12/2003 | Farmer ......................... | 701/45 |
| 6,781,705 B1 * | 8/2004 | Waslowski et al. ......... | 356/614 |
| 6,996,257 B1 * | 2/2006 | Wang .......................... | 382/118 |
| 6,999,606 B1 * | 2/2006 | Frischholz .................. | 382/118 |

* cited by examiner

*Primary Examiner*—Eric Culbreth
(74) *Attorney, Agent, or Firm*—Posz Law Group, PLC

(57) ABSTRACT

An object of the present invention is to determine a kind of a passenger, e.g., adult or child, without executing a complicated image processing, thereby controlling an unfolding of an air bag. The safety apparatus for an automobile crash extracts a head ellipse from an image outputted from an area sensor. The apparatus stores beforehand reference head ellipses of every possible kind of passenger's heads. The extracted head ellipse of the present passenger is selected among the references. Then, a region including the extracted head ellipse is designated to a future processing region for searching the same passenger's head at a time to come. Thus, the passenger's head is recognized simply and rapidly, even when the passenger has moved outside the future processing region.

25 Claims, 6 Drawing Sheets

SAFETY APPARATUS AGAINST AUTOMOBILE CRASH

BACKGROUND OF THE INVENTION

1. Field of the Invention

The present invention relates to a safety apparatus for an automobile crash, wherein a head of a driver or passenger is recognized, thereby controlling a safety unit, e.g., controlling an unfolding of an air bag.

2. Description of the Related Art

The unfolding of the air bag is controlled, for example, depending upon a kind of a driver and passengers, e.g., adult, or child. Further, a person's head is recognized on the basis of a face image extracted by a flesh color image picked up by a color area image sensor.

Further, the person's head is detected by face features.

However, it is not easy to identify the head on the basis of the flesh color, due to great differences thereof.

Further, it is not also easy to identify the head on the basis of shape patterns such as eyes, nose, ears. This is because glasses and masks disturb the head identification and the image processing becomes complicated, when the face is obliquely directed toward the area image sensor, thereby greatly changing the details of the face shape patterns.

SUMMARY OF THE INVENTION

An object of the present invention is to identify a driver or passenger in order to control an air bag unfolding at a car crash.

Another object of the present invention is to avoid a complicated image processing for identifying a head recognition.

The safety apparatus for automobile crash comprises: at least one area image sensor for picking up an image of a passenger (possibly including a driver); passenger information extracting means for extracting a passenger information, e.g., adult or child; and a safety unit control means for controlling an operation of a safety unit for an automobile crash (e.g., an air bag).

The passenger information extracting means stores beforehand closed shape images expressing every possible kinds of passenger's head profile who may possibly take a ride. The passenger information is determined by comparing the closed outlines extracted from the picked-up image which are supposedly passenger's head with the references. The determination result is inputted into the safety control unit, thereby controlling the safety unit.

The passenger's head is extracted on the basis of the outlines of the passenger's head. The head outline shape is in general nearly an ellipse. Further, the head is rotated around the ellipse's major axis which is held almost along the vertical axis. Therefore, the head outline shape is changed little by an individual difference and head direction. Accordingly, a memory load for reference images is low and a load for image processing for extracting the head ellipse is also low, thereby reducing an image processing time period and improving an accuracy of the passenger determination. The safety apparatus for automobile crash of the present invention is superior in a point of view of a rapid control of such a safety unit as an air bag, because the passenger recognition is more rapidly and accurately completed than conventional determinations by such other facial shapes as eyes, nose and mouth. Further, the present invention is more advantageous than the conventional passenger recognition, because glasses and a mask hide less part of the head, compared with the eyes, nose, or mouth, thereby degrading little the determination accuracy.

In the present invention, the passenger's information is determined on the basis of a closed curve, a part of which is an ellipse.

One or more embodiments can provide that when any image was not detected within the region, a whole of a two dimensional image is processed at a next time. Also, in accordance with one or more embodiments, when any image was not detected within the region, a whole of a two dimensional image area is further continuously processed. Furthermore, in accordance with one or more embodiments, a shape and position of the head ellipse expressed by parameters are employed for selecting one of the reference images almost the same as that of the passenger.

Therefore, according to the present invention, the two dimensional patterns of the reference head images and detected head image are simplified, thereby simplifying storing and processing the images. Further, such simple curve as an ellipse is parametrized, thereby further simplifying the image processing.

PREFERRED EMBODIMENT OF THE INVENTION

Figure 1:
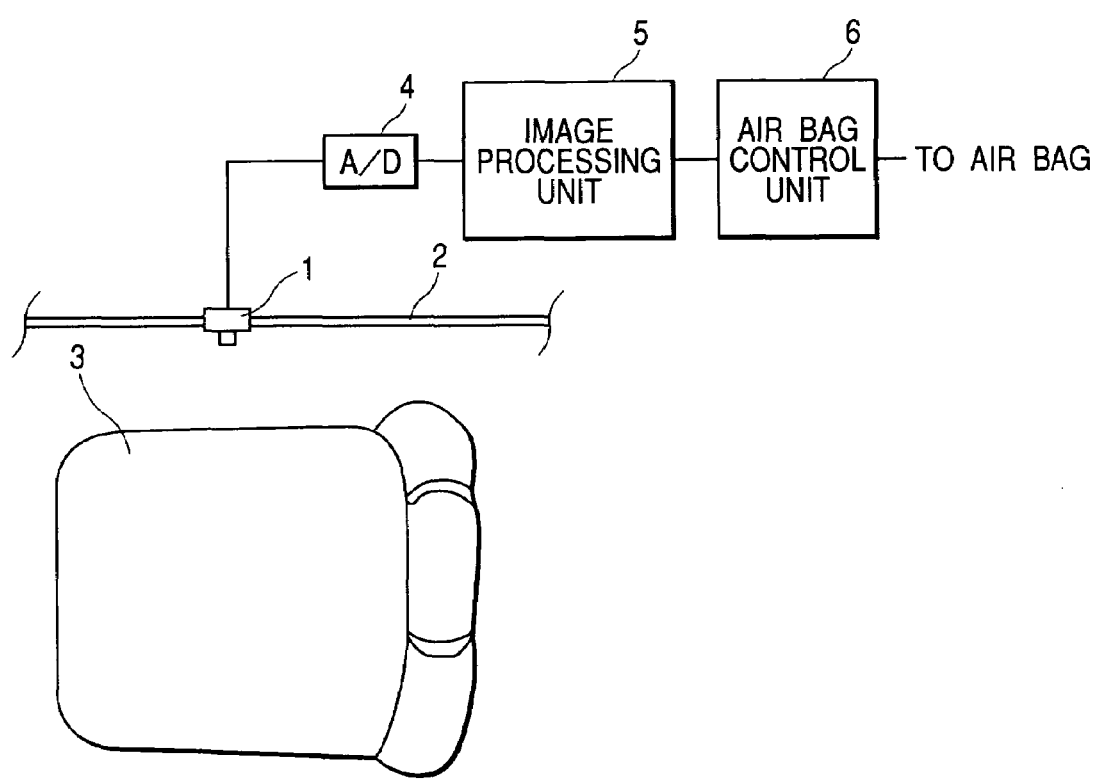
FIG. 1 is a conceptual block diagram of the safety apparatus for an automobile crash of the present invention.

A preferred embodiment and its modifications are explained, referring to the drawings.

FIG. 1 is a conceptual block diagram of the safety apparatus for a car crash of the present invention, wherein imaging means 1 (such as an area image sensor, e.g., CCD) is fixed at an upper lateral side of an automobile body 2 in order to pick up an image of a passenger on a passenger seat 3. Concretely, the area image sensor 1 looks down the upper space of a seat 3 and outputs the picked-up image to an image processing unit 5. The image signal is a sequentially outputted raster scan signal which constructs a two dimensional frame signal. The safety apparatus further comprises: an A/D converter 4 for converting the output from the area image sensor 1; and an air bag control unit 6 connected with the output terminal of the image processing unit.

The image sensor 1 preferably is highly sensitive to the infrared spectrum region, thereby being able to photograph even at a dark place or night time.

The image processing unit 5: receives an A/D converted frame signal; stores it in a frame memory in order to reduce its noises, to emphasize outlines in it and to digitize the signal by two bits; and processes it for a decision of passenger kind, e.g., adult or child, male or female. In place of using the A/C converter 4, the output from the area image sensor 1 may be digitized at two bits and inputted into the image processing unit 5. Further, the output from the area image sensor 1 may be emphasized on the horizontal and vertical outlines and inputted into the image processing unit 5. Further, the area sensor 1 itself may outputs two bit digital signals.

Further, a part of or all of the image processing unit 5 may be constructed by a single hardware. Further, not two bit signals, but multi-bit signals, e.g., eight bit signals may be inputted into the image processing unit 5 in order to improve a quality and accuracy of the image processing.

The image processing unit 5: extracts a passenger's head information (adult or child, male or female, or its location along the front-rear direction of the automobile, its location along the left-light direction, and even present or absent); and outputs it to an air bag control unit 6 which control the unfolding of the air bag on the basis of the head information.

Figure 2:
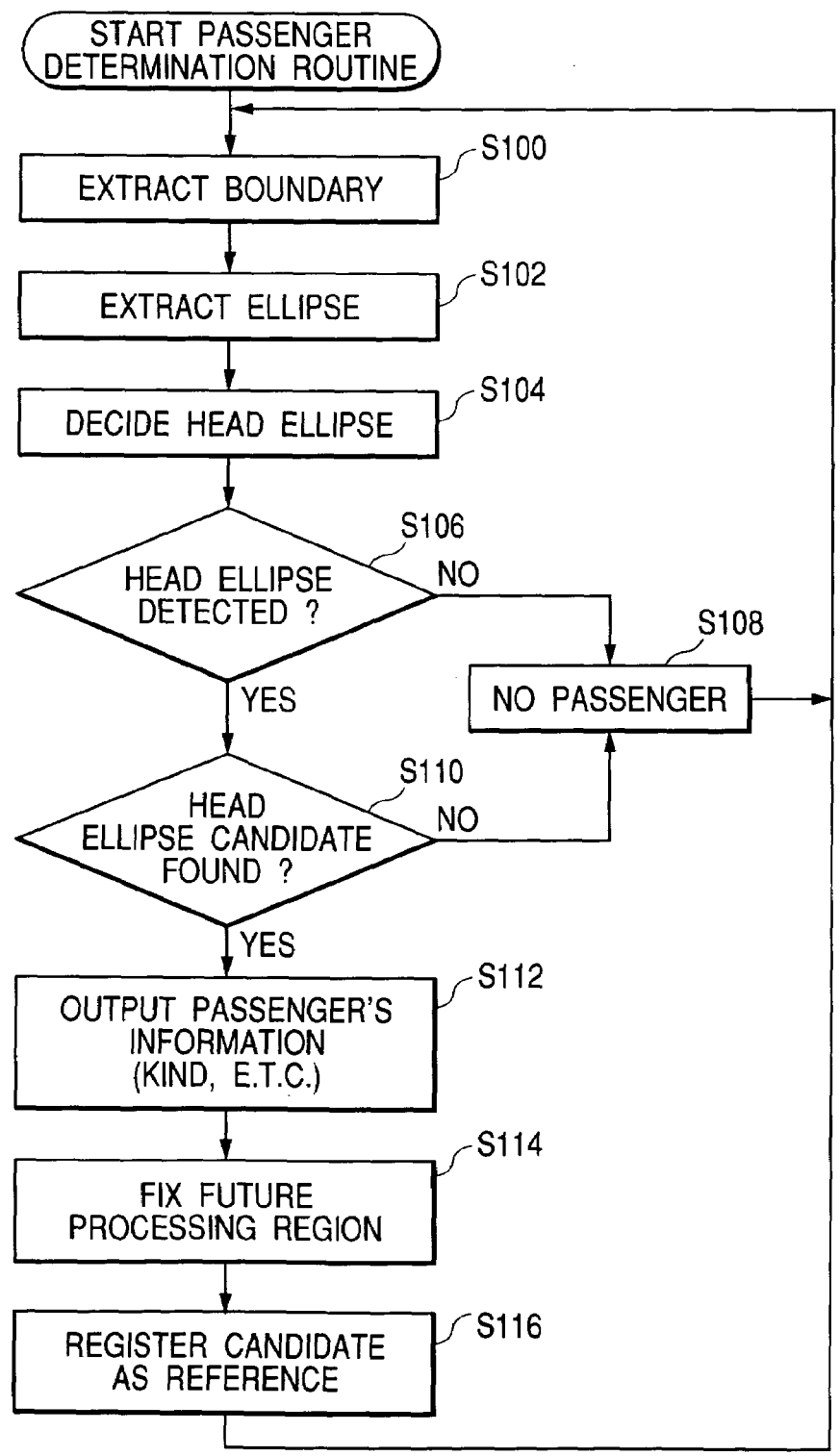
FIG. 2 is a flow chart for deciding a kind of a occupant (including a driver and passenger(s)), e.g., adult or child, thereby controlling an unfolding of an air bag of the safety apparatus for an automobile crash as shown in FIG. 1.

FIG. 2 is a flow chart for deciding a passenger kind. The passenger decision is executed by a micro-computer or a high speed hardware exclusively used for that purpose.

First, a boundary between two regions different in brightness is extracted at step S100 from a predetermined image region placed in a two-dimensional image space (that is, a scan region 32, illustrated in FIG. 3) for the sensor 1. The boundary in general includes a plurality of closed loop or outlines.

Next, elliptic boundaries are extracted among the boundaries at S102. The elliptic boundaries are determined by curvature changes along a boundary, or by a change in distances between a center of the points on the boundary. The elliptic boundaries can be easily detected by smoothing the boundaries as picked up by the area sensor 1. Further, the curvature of the boundary can be detected by coordinates of three points distant by a prescribed distance with each other. However, other known local curvature decision methods may be employed. Thus, the boundaries with a prescribed curvature change proper to the ellipse are easily found.

Next, an ellipse supposedly expressing a head is detected at S104. The ellipse shape of the detected head ellipse is such that the shape may belong to a shape range of reference ellipses stored beforehand. Thus, shapes and sizes which are elliptic but not deemed to be heads are excluded. Here, the detected head ellipse may be stored in a form of a two dimensional pattern or a parameter expression by a major axis, minor axis, a center coordinate, inclination of the major axis and ellipticity.

If a head ellipse was not detected at S106, it is determined and outputted a fact that there is no passenger and S100 follows. On the contrary, if a head ellipse was detected at S106, S110 follows.

Then, if the detected head ellipse is determined to be approximately the same as one of the reference head ellipses, that reference head ellipse is decided to be a head ellipse candidate of the passenger. On the contrary, if the detected head ellipse is not approximately the same as any of the reference head ellipses, S108 follows, thereby returning back to S100.

Further, at S112, a kind of the passenger, e.g., adult or child, is decided on the basis of the head ellipse candidate and the decided kind is outputted to the air bag control unit 6. Or rather, it may happen to be decided on merely the presence or absence of the passenger at S112.

Figure 3:
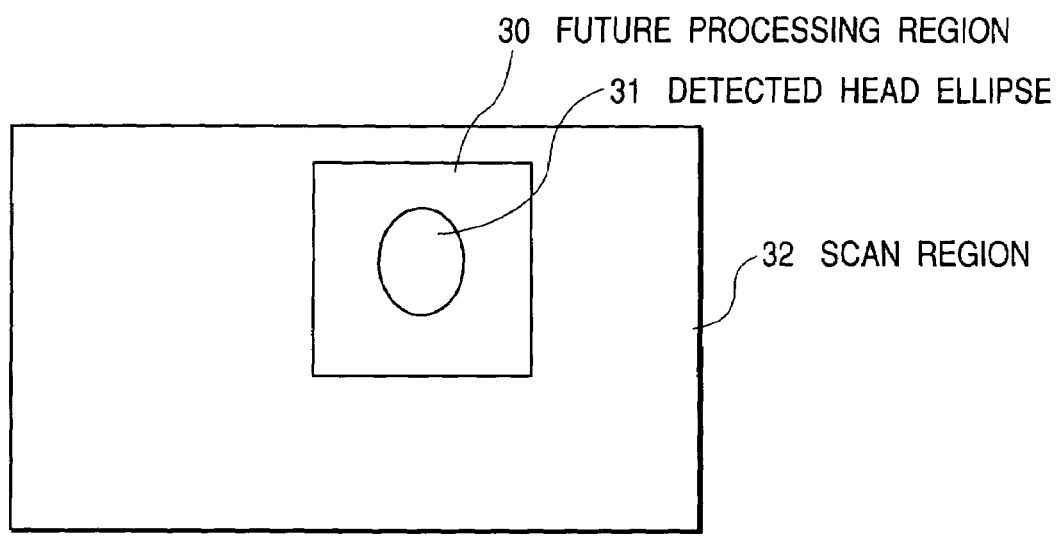
FIG. 3 shows a future processing region (including a detected head ellipse) designated for detecting the head ellipse at a next time to come, thereby simply and rapidly detecting the present passenger, even when the present passenger has moved outside the future processing region.

Next, an image region surrounding the detected head ellipse is decided as a future process region to be processed by steps S100 to S110 in the next head image processing. The size of the future process region is set up in such a manner that the passenger's head will be placed within the future processing region in the next head image processing, even though the head is moved at a predetermined speed during the period of time from the current head image processing to the next head image processing. FIG. 3 shows the future processing region 30 (in the two dimensional scan region 32). The detected head ellipse 31 is surrounded by the future processing region 30.

Next, the detected head ellipse is newly registered as a reference head ellipse at S116, thereby comparing at a first priority the newly registered reference head ellipse with a passenger's head in the next head image processing. Thus, the period of time required for the next head image processing is effectively reduced. Here, even though the detected head ellipse is inclined with respect to a passenger's head, or is turned, the detected head ellipse may be registered.

According to the above explained safety apparatus, even though a viewing angle to a passenger's head is changed, a change of a detected head ellipse is small. Further, differences in head ellipses among passengers are small. Therefore, the head image processing can be easily executed for a detected head ellipse. Accordingly, the head image processing can be simplified and executed rapidly while suppressing the lowering of accuracy in the determination of a head image.

Modified Embodiment 1

Boundaries without a passenger are extracted from a frame image and are stored beforehand. Then, the stored boundaries are subtracted from boundaries extracted at step S100 from a frame image with a passenger, and extraction of a head ellipse is executed at step S102 based on the subtracted boundaries. Thus, the image noise is effectively removed.

Modified Embodiment 2

Deformed head outlines with hat, cap or special hair style are registered for the reference head ellipses. In this case, even though a head ellipse is detected from a passenger with a hat, cap, or special hair style, the detected head ellipse can be appropriately compared with reference ellipses stored beforehand. Accordingly, the determination accuracy is improved. Further, lower head portions irrelevant to the hat, cap or special hair style may be employed as the reference head ellipses. In this case, when head image processing is executed for a passenger with a hat, cap or special hair style, a head ellipse is detected from a lower head portion of the passenger, and the detected head ellipse is compared with reference ellipses stored beforehand. Accordingly, even though head image processing is executed for a passenger with the hat, cap or special hair style, the degradation of the determination accuracy can be prevented.

Modified Embodiment 3

A model image is registered in place of reference ellipses, and a learning operation using the model image is performed. That is, each time a head ellipse of a passenger similar to the model image is found, the head ellipse is registered as a reference ellipse. When the learning operation is continued, many reference ellipses are stored. These reference ellipses may be stored in ROM. Therefore, the determination accuracy for a head ellipse of a passenger can be improved.

Modified Embodiment 4

The passenger's head often moves right and left, thereby changing the head ellipse size. Therefore, the detected head ellipse may be enlarged or reduced on the basis of a measured actual distance between the head and area image sensor 1. The enlargement or reduction may be executed merely by correcting the ellipse parameters.

Figure 4:
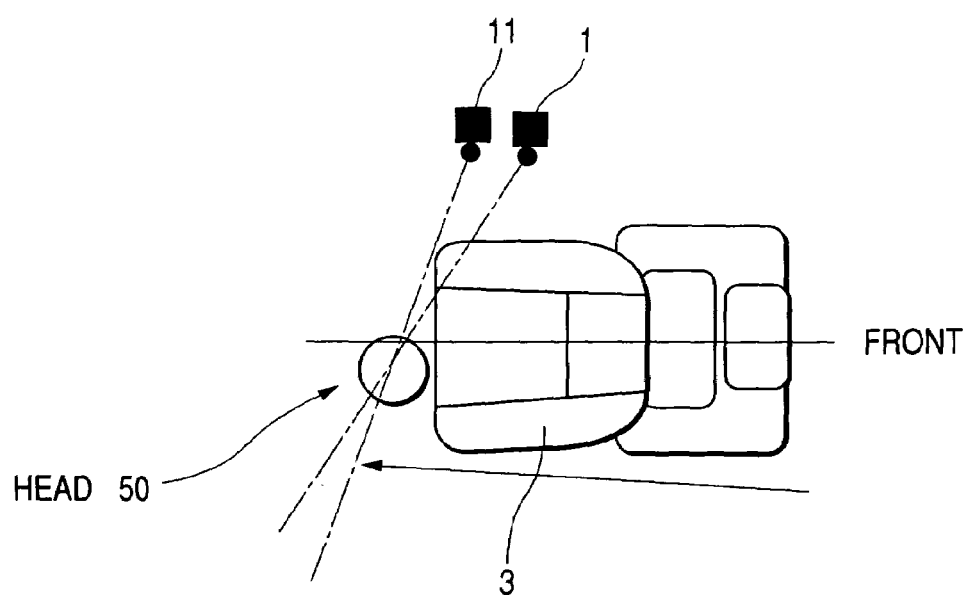
FIG. 4 is a plan view of the passenger's seat around which one more area image sensor is provided.

FIG. 4 is a plan view of the passenger seat 3, around which another area image sensor 11 as well as the area image sensor 1 are disposed distant by a prescribed distance along the front-rear direction, thereby measuring the actual distance between the passenger's head 50 and sensors 1 and 11 by using the stereo range finding method. The area sensors 1 and 11 are used both for the passenger determination and distance measurement.

Modified Embodiment 5

The passenger's physical condition may be known by a height of the detected head ellipse, thereby determining, e.g., whether the passenger is adult or child.

Modified Embodiment 6

A distance between the head and air bag is calculated on the basis of a head position along the front-rear direction, because the area image sensor 1 is disposed at a lateral side of the passenger's seat. Thus, the air bag unfolding is controlled on the basis of the head-bag distance.

Modified Embodiment 7

Figure 5:
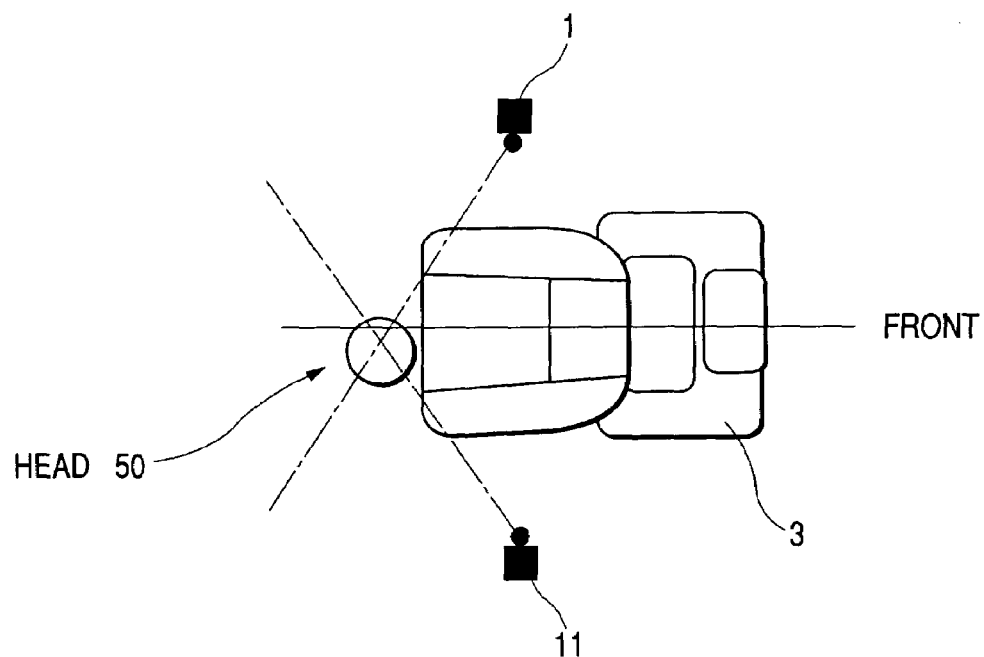
FIG. 5 is another arrangement of the image sensors.

FIG. 5 shows another arrangement of two image sensors 1 and 11, wherein the passenger's seat 3 is between those sensors. On the basis of the center position of head ellipse detected by the area image sensors 1 and 11: a center position of the head ellipse along the right-left direction is calculated; a distance between the head and area image sensors 1 and 11 is calculated on the basis of the calculated center position; and the size of the detected head ellipse is enlarged or reduced on the basis of the calculated distance.

The determination accuracy is not lowered, even when the passenger rotates his or her head, because the area sensors 1 and 11 independently determine the passenger kind. The shoulder width of the passenger is further measured by the area image sensor 11, thereby knowing more accurately the passenger's physical conditions.

Modified Embodiment 8

Figure 6:
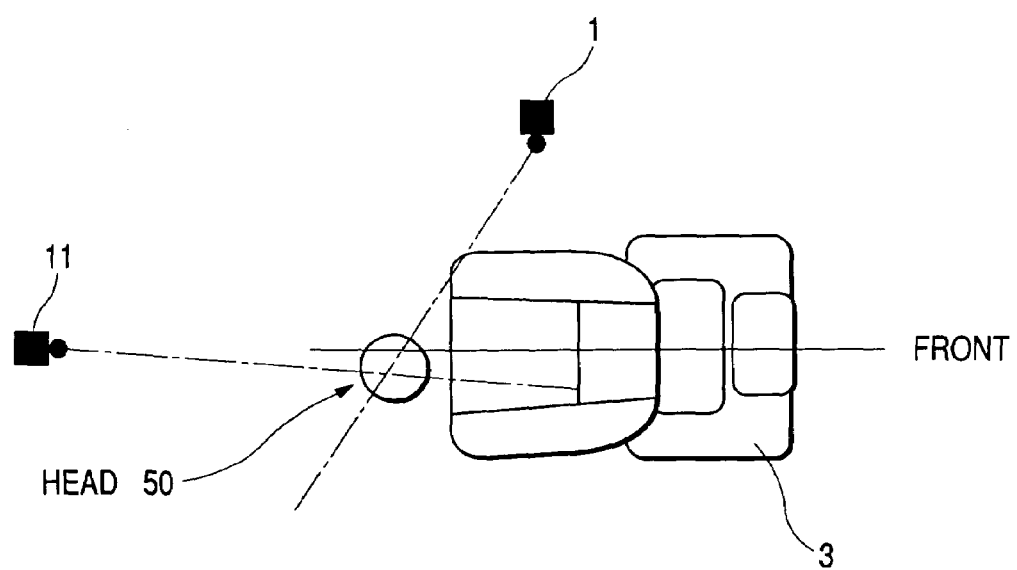
FIG. 6 is a still another arrangement of the area image sensors.

FIG. 6 shows still another sensor arrangement, wherein the area image sensor 1 is disposed at a lateral side of the passenger's seat, while another area image sensor 11 is disposed in front of the seat 3. The image size of the area sensor 11 is corrected on the basis of the position along the front-rear direction obtained by the area image sensor 1, while the image size of the area sensor 1 is corrected on the basis of the position along the right-left direction obtained by the area image sensor 11. Thus, the determination accuracy is further improved.

The determination accuracy is not lowered, even when the passenger rotates his or her head, because the area sensor 1 and 11 independently determine the passenger kind. The shoulder width of the passenger is further measured by the area image sensor 11, thereby knowing more accurately the passenger's physical conditions.

Modified Embodiment 9

Figure 7:
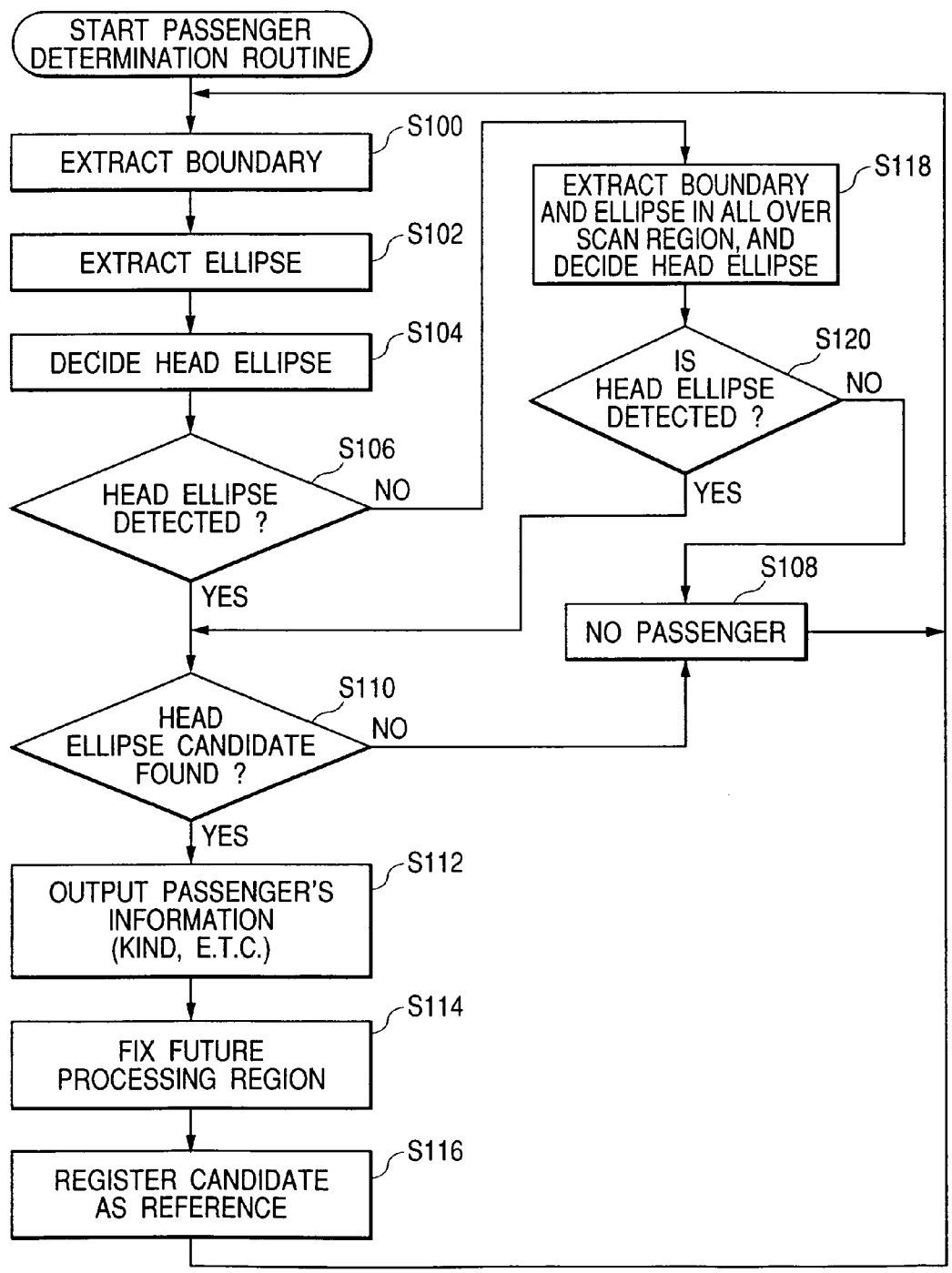
FIG. 7 is a modified version of the flow chart as shown in FIG. 2.

FIG. 7 is a modified version of the flow chart as shown in FIG. 2 for the passenger determination.

As illustrated in FIG. 7, if there is not found any head ellipse at step S100, boundary extraction, ellipse extraction and decision of head ellipse are further continuously executed, in the same manner as those at steps S100, S102 and S104 illustrated in FIG. 2, all over the two dimensional scan region 32 at S118. At step S120, the unit 5 judges whether or not a head ellipse is found at step S118. If a head ellipse is detected, then, S110 as shown in FIG. 2 is executed for finding a head ellipse candidate. On the contrary, if any head ellipse is not detected at S118, then, S108 follows for outputting a fact that no passenger is seated. It may be scheduled to search all over the two dimensional scan region 32 at a time to come, if any head ellipse is not detected in the future processing region 30.

Thus, even though no head ellipse is detected in the predetermined processing region or the future processing region in the previous head image processing, the detection of a head ellipse is executed all over the two dimensional scan region 32 at step S108 in the next head image processing. Therefore, a head ellipse of a passenger, of which a head is not placed in the predetermined or future processing region but is placed in the two dimensional scan region 32, can be detected.

Modified Embodiment 10

Figure 8:
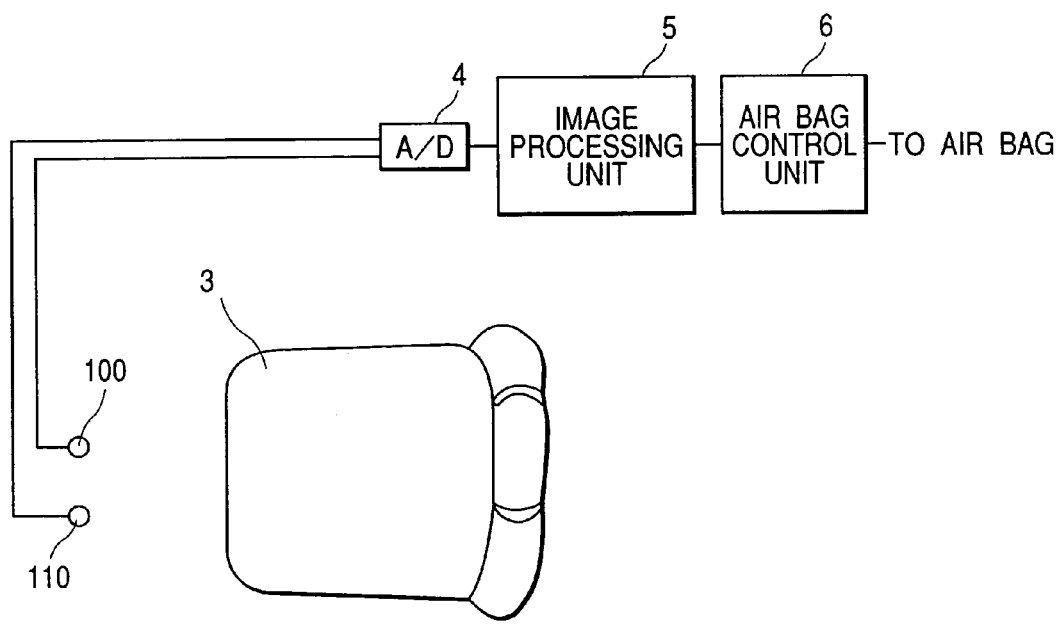
FIG. 8 is a conceptual block diagram of the safety apparatus of the present invention provided with a stereo range finder.

FIG. 8 is another conceptual block diagram of the safety apparatus for automobile crash of the present invention. In place of the area image sensor 1, a stereo range finder comprising area sensors 100 and 110 for head detection and head-air bag distance measurement is used. Therefore, a distance between a head of a passenger and an air bag can be detected in addition to a head elipse of the passenger. Accordingly, the configuration of the sensor for detecting both the head ellipse and the distance can be simplified.

Modified Embodiment 11

In addition to the stereo range finder in the modified embodiment 10, another area sensor may be provided, thereby enlarging or reducing a picked-up image in accordance with a position of the passenger's head measured by the range finder.

What is claimed is:

1. A safety apparatus for automobile crash, comprising:
   at least one imaging means for repeatedly picking up a passenger's head image including a passenger on a seat;
   extracting means for extracting passenger's information on the basis of the passenger's head image;
   safety means for protecting said passenger from said automobile crash; and
   controlling means for controlling said safety means on the basis of said passenger's information,
   wherein said extracting means:
   stores reference images similar to head outlines, a part of which is a part of an ellipse;
   detects a head ellipse from the passenger's head image outputted from said imaging means at a first time;
   stores the detected head ellipse of the first time in a form of parameters defining the head ellipse;
   judges whether the head ellipse of the first time stored in the form of the parameters is almost the same as one of said reference images;
   decides the passenger's information responsive to one of the reference images when the head ellipse of the first time is almost the same as the one of the reference images;
   outputs said decided passenger's information of the first time to the safety means;
   stores the detected head ellipse as a reference image:
   detects a head ellipse from the passenger's head image outputted from said imaging means at a second time coming after the first time only in a region including the head ellipse detected at the first time;
stores the detected head ellipse of the second time in a form of parameters defining the head ellipse;
judges whether the head ellipse of the second time stored in the form of the parameters is almost the same as one of said reference images;
when the head ellipse of the second time differs from any of the reference images, detects a head ellipse from the passenger's head image at a third time coming after the second time in a whole of a two-dimensional image area;
stores the detected head ellipse of the third time in the form of the parameters;
judges whether the head ellipse of the third time is almost the same as one of said reference images;
decides the passenger's information responsive to one of the reference images when the head ellipse of the third time is almost the same as the one of the reference images; and
outputs the decided passenger's information of the third time to the safety means.

2. The safety apparatus according to claim 1, wherein said safety means is an air bag.

3. The safety apparatus according to claim 1, wherein: said reference images represent kinds of passengers; and said passenger's information represents one of said kinds of said passengers.

4. The safety apparatus according to claim 1, wherein said extracting means determines that said seat is vacant, if any image almost the same as that of said passenger can not be selected.

5. The safety apparatus according to claim 1, wherein said passenger's information represents a position of said passenger along the front-rear direction.

6. The safety apparatus according to claim 1, wherein said imaging means is or are disposed at a lateral side of said seat.

7. The safety apparatus according to claim 1, wherein said imaging means are disposed at a lateral side and a front side of said seat.

8. The safety apparatus according to claim 1, wherein said imaging means is a stereo range finder having two sensors.

9. The safety apparatus according to claim 8, wherein the stereo range finder enlarges or reduces a picked-up image in accordance with a position of the passenger's head measured by said stereo range finder.

10. The safety apparatus according to claim 1, wherein said reference image is limited to said ellipse.

11. The safety apparatus according to according to claim 10, wherein a shape and position of said head ellipse expressed by the parameters are employed for selecting one of said reference images almost the same as that of said passenger.

12. A safety apparatus for automobile crash, comprising:
at least one imaging means for picking up a passenger's head image including a passenger on a seat;
extracting means for extracting passenger's information on the basis of the passenger's head image;
safety means for protecting said passenger from said automobile crash; and
controlling means for controlling said safety means on the basis of said passenger's information,
wherein said extracting means:
stores reference images similar to head outlines, a part of which is a part of an ellipse;
detects a head ellipse from the passenger's head image outputted from said imaging means;
stores the detected head ellipse in a form of parameters defining the head ellipse;
judges whether the head ellipse stored in the form of the parameters is almost the same as one of said reference images;
decides the passenger's information responsive to one of the reference images when the head ellipse of the passenger's head image is almost the same as the one of the reference images; and
outputs said decided passenger's information to the safety means wherein said reference images include the detected head ellipse;
wherein a region including said detected head ellipse is processed at a time to come;
wherein only said region is processed; and
when any image was not detected within said region, a whole of a two dimensional image area is further continuously processed.

13. The safety apparatus for automobile crash, comprising:
at least one imaging means for picking up a passenger's head image including a passenger on a seat;
extracting means for extracting passenger's information on the basis of the passenger's head image;
safety means for protecting said passenger from said automobile crash; and
controlling means for controlling said safety means on the basis of said passenger's information,
wherein said extracting means:
stores reference images similar to head outlines, a part of which is a part of an ellipse;
detects a head ellipse from the passenger's head image outputted from said imaging means;
stores the detected head ellipse in a form of parameters defining the head ellipse;
judges whether the head ellipse stored in the form of the parameters is almost the same as one of said reference images;
decides the passenger's information responsive to one of the reference images when the head ellipse of the passenger's head image is almost the same as the one of the reference images; and
outputs said decided passenger's information to the safety means;
wherein the form of the parameters includes at least one of a length of a major axis, a length of a minor axis, values of a center coordinate, an inclination of the major axis and ellipticity.

14. A safety apparatus for automobile crash, comprising:
at least one imaging means for picking up a passenger's head image including a passenger on a seat;
extracting means for extracting passenger's information responsive to the passenger's head image;
safety means for protecting the passenger from the automobile crash; and
controlling means for controlling the safety means responsive to the passenger's information;
wherein the extracting means:
stores reference ellipses similar to head outlines;
picks up a first passenger's head image of the passenger in a predetermined processing region denoting a part of a two dimensional image area;
tries to detect a head ellipse from the first passenger's head image picked up in the predetermined processing region;

picks up a second passenger's head image of the passenger in a whole of the two dimensional image area when no head ellipse is detected from the first passenger's head image;

detects a head ellipse from the second passenger's head image picked up in the whole of the two dimensional image area;

stores the detected head ellipse in a form of parameters defining the head ellipse;

compares a shape and a position of the detected head ellispe; parameters with each of the reference ellipses to obtain comparison results;

judges responsive to the comparison results whether the head elipse stored in the form of the parameters is almost the same as one of the reference ellipses;

decides the passenger's information responsive to one of the reference images when the head ellipse of the passenger's head image is almost the same as the one of the reference images; and outputs the decided passenger's information to the safety means.

15. The safety apparatus according to claim 14, wherein the safety means is an air bag.

16. The safety apparatus according to claim 14, wherein the reference ellipses represent kinds of passengers, and the passenger's information represents one of the kinds of passengers.

17. The safety apparatus according to claim 14, wherein the extracting means determines that the seat is vacant, if any image almost the same as that of the passenger cannot be selected.

18. The safety apparatus according to claim 14, wherein the passenger's information is a position of the passenger along the front-rear direction.

19. The safety apparatus according to claim 14, wherein the detected head ellipse of the passenger is added to the reference images.

20. The safety apparatus according to claim 14, wherein the imaging means is or are disposed at a lateral side of the seat.

21. The safety apparatus according to claim 14, wherein the imaging means are disposed at both lateral sides of the seat.

22. The safety apparatus according to claim 14, wherein the imaging means are disposed at a lateral side and a front side of the seat.

23. The safety apparatus according to claim 14, wherein the imaging means is a stereo range finder having two sensors.

24. The safety apparatus according to claim 23, wherein the stereo range finder enlarges or reduces a picked-up image in accordance with a position of the passenger's head measured by the stereo range finder.

25. A safety apparatus for automobile crash, comprising:

at least one imaging means for picking up a passenger's head image including a passenger on a seat;

extracting means for extracting passenger's information responsive to the passenger's head image;

safety means for protecting the passenger from the automobile crash; and controlling means for controlling the safety means responsive to the passenger's information;

wherein the extracting means:

stores reference images similar to head outlines, a part of which is a part of an ellipse;

detects a head ellipse responsive to the passenger's head image outputted from the imaging means;

selects one of the reference images almost the same as that of the passenger;

decides the passenger's information responsive to the selected reference image; and outputs the decided passenger's information to the safety means, wherein the imaging means are disposed at both lateral sides of the seat.

* * * * *